May 10, 1966 A. G. EGGERS 3,250,388
CONTAINER TESTING AND SORTING APPARATUS
Filed June 10, 1964 3 Sheets-Sheet 1
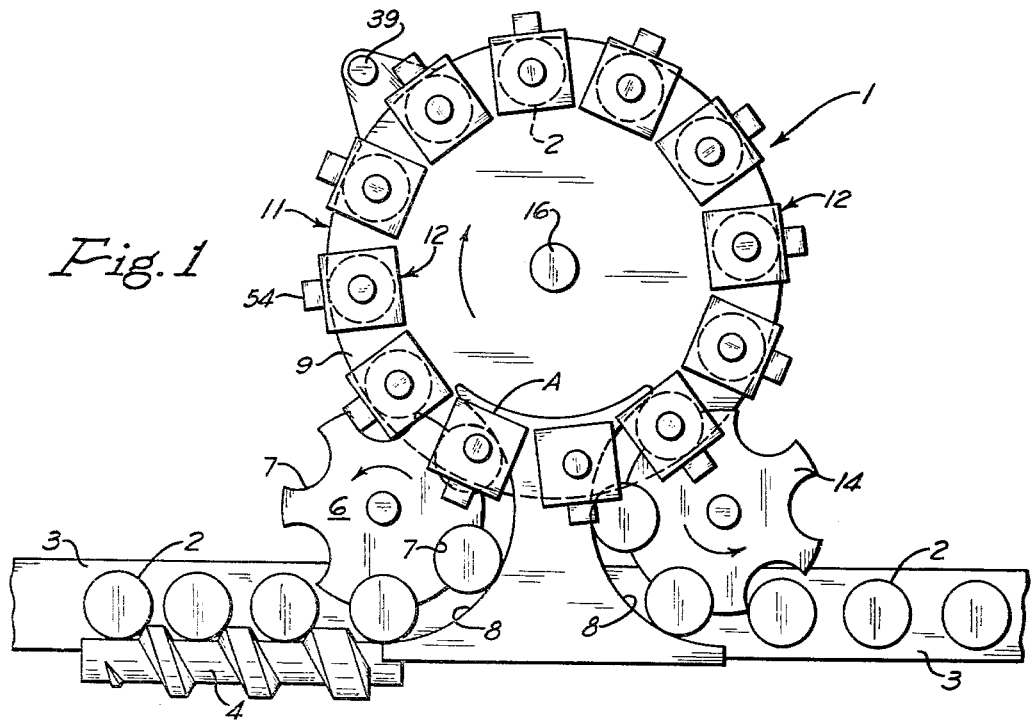
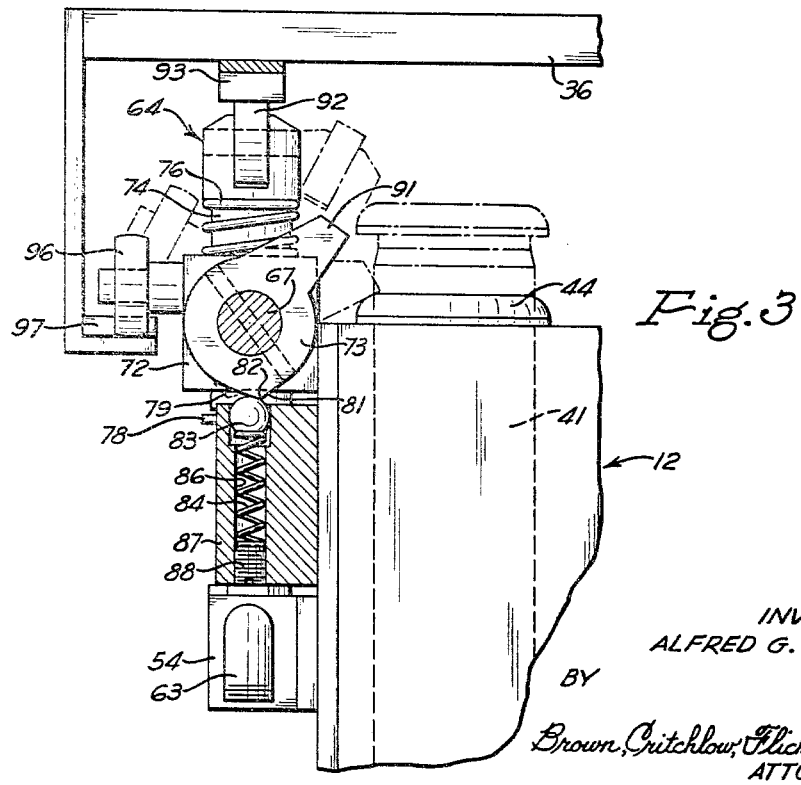
INVENTOR.
ALFRED G. EGGERS
BY
Brown, Critchlow, Flick & Peckham
ATTORNEYS.

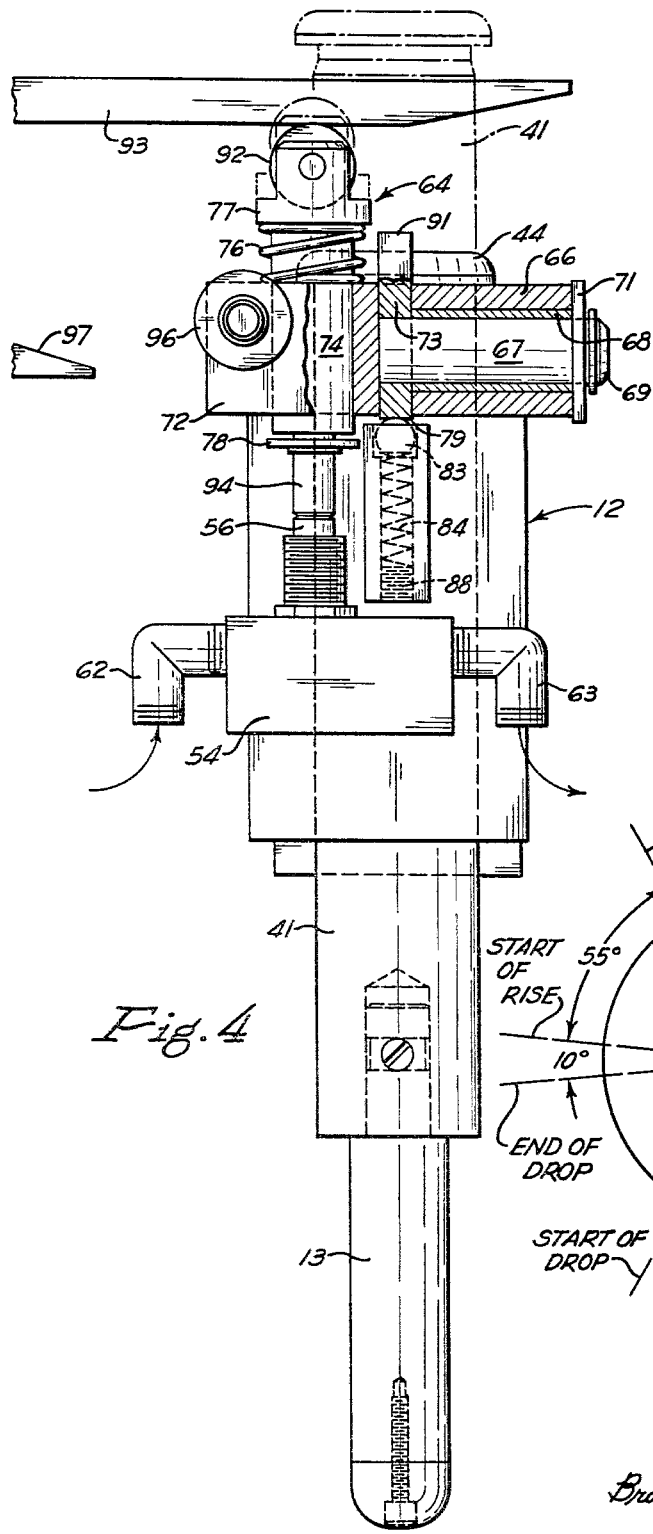

United States Patent Office 3,250,388
Patented May 10, 1966

3,250,388
CONTAINER TESTING AND SORTING
APPARATUS
Alfred G. Eggers, Pittsburgh, Pa., assignor to Horix Manufacturing Company, a corporation of Pennsylvania
Filed June 10, 1964, Ser. No. 373,918
7 Claims. (Cl. 209—82)

This invention relates to apparatus for testing certain physical characteristics of a series of containers and for rejecting those that do not meet a predetermined physical standard. The invention is particularly useful in bottle-making plants in which a large number of containers must conform to certain physical standards and are inspected and sorted for such conformity before they are shipped.

It is among the objects of this invention to provide testing and sorting apparatus for a line of continuously moving containers, in which those containers that have certain physical defects, as, for example, too small a neck opening, can be first detected and then ejected from the line without interrupting or slowing down the movement of the remaining containers.

Another object is to provide improved means for actuating an ejector to remove a container from the line in response to an earlier testing operation that sensed a lack of conformity in that container.

Other objects will be apparent from the following description of a preferred embodiment of the invention, in connection with the attached drawings, in which FIG. 1 is a somewhat diagrammatic plan view of the testing and sorting apparatus and of the means for continuously feeding containers to it;

FIG. 3 is an enlarged view, partly in section, of a portion of FIG. 2, showing in more detail the actuator that operates the ejector mechanism;

FIG. 4 is a side elevation, partly in section, of the actuator mechanism shown in FIG. 3; and FIG. 5 is a diagram showing the sequence of operations in this apparatus in relation to the angular position of the testing means about a vertical axis.

Figure 2:
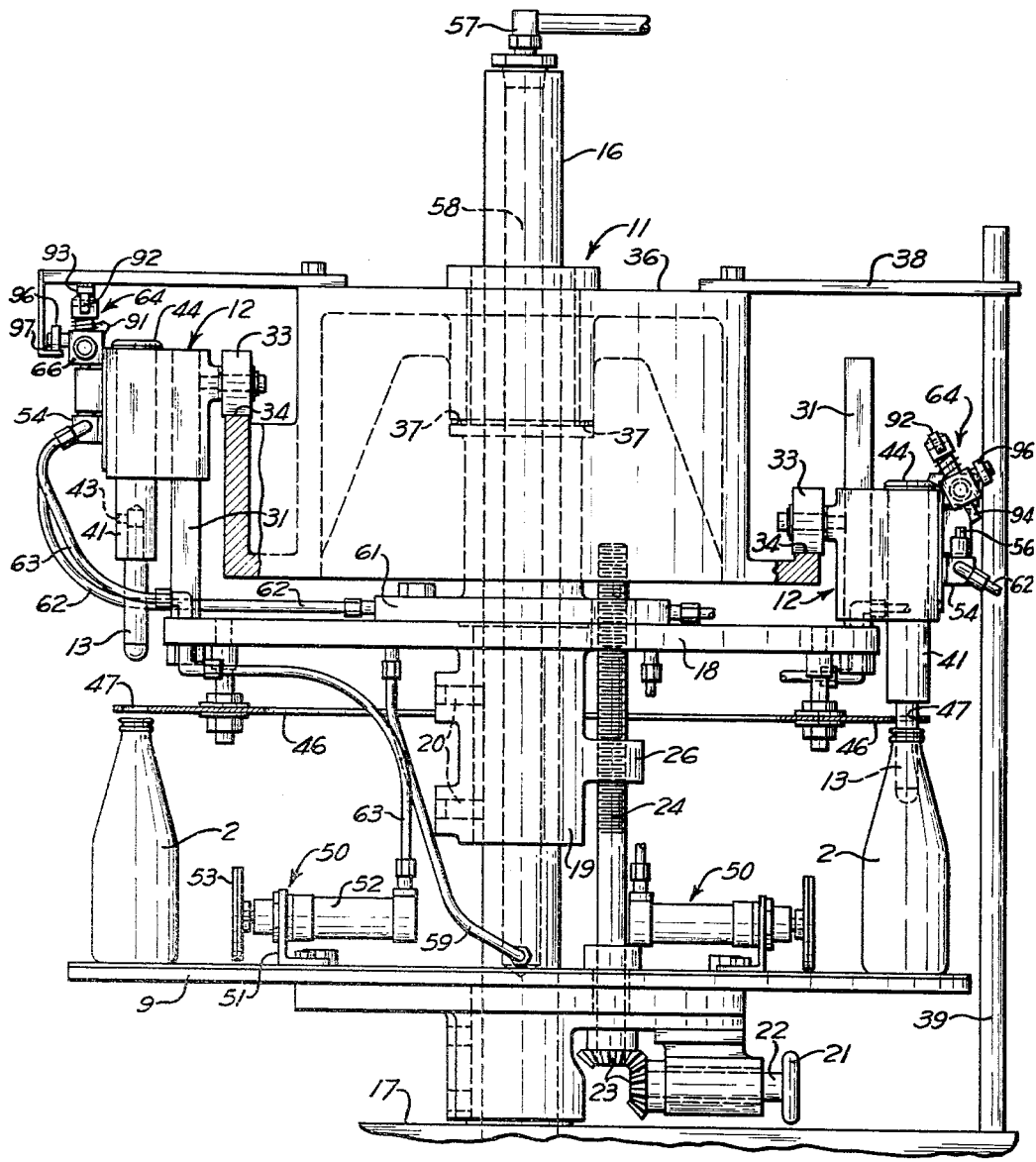
FIG. 2 is a fragmentary front elevation, partly in section, of the testing and sorting apparatus shown in FIG. 1.

The apparatus that includes the present invention comprises a rotary turret and means for feeding containers successively onto the turret and for positioning each container thereon in vertical alignment with separate testing and sorting means for testing each container and for later ejecting from the turret any container that did not conform in the test to a predetermined physical standard. These means include a plurality of gage carriers (a separate one for each container on the turret), which are moved upward and downward by cam means as the turret rotates. Supported by each carrier is a separate gage for testing a given physical condition of the container, such as the minimum diameter of its neck opening. Each gage normally moves upward and downward with its supporting carrier, but is so mounted as to be able to move upward relative to the carrier when descent of the gage is obstructed by a nonconforming container, as where the neck opening is too small to receive the gage. In response to such upward movement of the gage relative to its carrier, an actuator mounted on the carrier in a normally inactive position is tripped to an active position. In the latter position, the actuator is adapted to engage fixed cam means, but only after the turret has turned through a certain angle to permit the gage carrier to be raised so that the gage itself will be completely out of engagement with the container. The subsequent engagement of the actuator with the fixed cam operates, through suitable energizing means, an ejector that removes the defective container from the turret. Finally, reset means are provided for resetting the actuator to its normal inactive position before the beginning of another testing and sorting cycle.

Referring to the drawings, the testing and sorting apparatus is indicated generally by the numeral 1. It is a rotary type machine adapted to test and sort a series of containers 2, moving transversely in front of the machine on a conveyor 3. A feed screw 4 separates the containers by the desired interval and feeds them at the proper rate into a feed star wheel 6, the containers fitting between pockets 7 in the star wheel and a guide rail 8. The star wheel delivers the containers to a table 9 of a continuously revolving turret 11 and, in doing so, positions each container in proper vertical alignment beneath a separate gage carrier 12 and a gage 13 supported by each carrier. During the testing cycle, the gage carrier and gage move downward, as described below in more detail, for gaging a physical characteristic of the container. The gage carrier then moves upward; and, when the carrier has reached its elevated position, the container is ejected from the turret only if the container did not meet the given physical standard. Otherwise, the container continues around the turret until it is delivered to a discharge star wheel 14, which returns the container to conveyor 3.

The testing and sorting apparatus is shown in more detail in FIG. 2, where the turret 11 includes a central column 16, which is rotatably supported on a base 17 and rotated by conventional means (not shown). Table 9 is supported on this column and rotates with it. Also supported thereon is a flange member 18 having a hub portion 19, which is adjustably secured to the column with set screws 20, and rotates with the column. The height of the flange member can be adjusted by turning a handwheel 21, which is connected by a horizontal shaft 22 and bevel gears 23 to a threaded shaft 24. The latter engages a mating threaded member 26 on the flange member 18. Around the outer circumference of the flange member are mounted a plurality of square vertical posts 31, there being twelve such posts in the embodiment shown. Slidably mounted on each post for vertical reciprocation thereon is a gage carrier 12. Rotatably mounted on the inner side of each carrier is a cam follower wheel 33, which rides on a stationary cam track 34. The latter is mounted on a top frame 36, which is supported by bearings 37 on the central column 16. To keep the top frame from rotating, a torque arm 38 extends from the frame to a rod 39, which is rigidly mounted on base 17. The cam track 34 is so disposed that each gage carrier 12 will make one complete reciprocation for each rotation of the turret. As shown in FIG. 5, the gage carrier begins to move downward under the action of gravity when it is approximately in position A in FIG. 1, and preferably reaches its lowest point during the first 90 degrees of rotation from the front of the machine. After a slight dwell at its lowest point, the gage carrier rises to its initial height, preferably before it has completed 180 degrees of rotation from the front of the machine, and remains at that height during the rest of the cycle.

Supported on each gage carrier is a gage holder 41, in the lower end of which a removable gage 13 is held by a set screw 43. The gage shown is a cylindrical plug rounded at its lower end, and adapted to test the neck opening of a container for conformity to a minimum standard diameter. The gage holder is slidably supported for vertical reciprocation in the gage carrier. Normally, the holder assumes, under the force of gravity, a lowermost position in the carrier and is retained therein by a flanged cap 44. However, as the carrier moves downward, if the gage is unable to enter the neck of a container, as where the neck opening is smaller than a minimum diameter determined by the gage diameter, downward movement of both gage and gage holder will be arrested. In such case, the gage carrier will continue to move downward, but the gage holder (though not changing its absolute elevation) will move upwardly relative to the carrier. When the gage carrier later moves upward and approaches its top position, it will then lift the gage out of contact with the container, freeing the container for ejection from the turret. Since both the gage carrier 12 and the gage holder 41 descend solely under the influence of gravity, there is no undue pressure forcing the gage into the mouth of a container not quite big enough to receive it. In the event that the gage should, nevertheless, become stuck in the mouth of a container, and on being raised, tend to lift the container from the table, an annular stripper plate 46, which is adjustably mounted below the flange member 18 and provided with holes 47 through which the gages pass before they enter the containers, will strip the container from the gage.

Associated with each gage carrier 12 is a separate ejector 50, mounted on a flange 51, which is secured to table 9 radially inward of each container position. Although the ejector can take many forms, a convenient one is a spring return, pneumatic cylinder 52, provided with a pusher plate 53. The spring (not shown) returns to the pusher plate to its normal retracted position, as shown in FIG. 2. The operation of each ejector is controlled by a separate air valve 54 mounted on the side of the associated gage carrier. Each air valve is provided with an operating plunger 56, that, when depressed, admits air to the ejector cylinder from a central compressed air supply (not shown) through a swivel connection 57 on the top of column 16. This column is hollow for a portion of its length to provide an air passage 58, which communicates by an air hose 59 with an air manifold 61. Other air hoses 62 connect the manifold to each air valve 54, which is, in turn connected by a hose 63 to one of the ejectors.

Each air valve 54 is controlled by a separate actuator 64, which includes a bracket member 66 mounted on the gage carrier above the air valve. In this bracket is rotatably mounted a horizontal pin 67 in a bushing 68. One end of the pin is provided with a head 69 and a washer 71 to limit axial movement of the pin in one direction. On the other end of the pin are rigidly secured a plunger holder 72 and a tripping cam 73. Holder 72 slidably supports a cylindrical plunger 74. A coil spring 76, extending between a collar 77 on the plunger and holder 72, urges the plunger upwards relative to its holder, such upward movement being ultimately limited by a washer 78 secured to the lower portion of the plunger below the holder. Actuator 64 is adapted to rock about the horizontal axis of pin 67 and to occupy either one of the two positions. In its normal first position, the actuator is tilted so that the axis of plunger 74 is approximately 30 degrees from the vertical (shown in broken lines in FIG. 3 in this position). In its second or active position, the axis of the plunger is vertical (as shown by the solid lines in FIG. 3). These two positions are defined by the engagement of one of two cam surfaces 79 and 81, which meet at an edge 82 on tripping cam 73, with a ball detent 83. The latter is pressed against one of the cam surfaces by a spring 84 received in a hole 86 in a block 87 attached to the gage carrier. The spring pressure can be adjusted by a screw 88 threaded in hole 86. By this arrangement, actuator 64 will rock between its first and second angular positions and will be held in one of those positions until tripped or reset to the other.

When actuator 64 is in its normal first position (inactive), a tripping arm 91 on cam 73 engages flange 44 on the upper end of gage holder 41, when the latter is in its lowermost position relative to its supporting gage carrier 12. However, any relative vertical movement between the gage holder and the gage carrier (which will occur when both elements are moving downward and when descent of the gage holder is stopped by a nonconforming container obstructing the gage) will trip the actuator into its second (active) position. In the latter position, a cam follower wheel 92, rotatably supported on the upper end of the actuator plunger 74, will engage a cam track 93 supported from the top frame 36 and extending circumferentially over a portion of the arc through which the gage carrier moves in each testing and sorting cycle. This cam track forces the actuator plunger 74 downward against the urging of its spring 76, causing a contact member 94 on the bottom of plunger 74 to engage and depress valve plunger 56 to open air valve 54 and thereby energize ejector 50. When the ejector is energized, it pushes the defective container radially off of the turret onto a conveyor (not shown). The actuator 64 is then reset to its normal inactive first position by a reset roller 96 rotatably mounted on plunger holder 72 upon engagement of this roller with a cam track 97, also supported from the top frame 36. Cam track 97 is positioned to engage the reset roller after the ejector mechanism has been energized and before the beginning of a new testing and sorting cycle.

Although the invention has been described only with reference to a gage for testing whether the neck opening of a container conforms to a minimum diameter, it will be apparent that other gages can be used for testing other physical dimensional standards for a container, provided that a container conforming to the standard in question will permit the gage and its supporting gage holder to descend with the gage carrier to the lowermost position reached by the latter without relative vertical movement between those elements and, on the other hand, that a container not conforming to the given standard will arrest the descent of the gage and gage holder, thereby tripping the actuator mechanism as described above. For example, it is frequently desirable to test containers to see that they do not exceed a maximum height. In such case, the testing gage would be of such shape and dimensions as to move downward to its lowermost position without tripping the actuator mechanism in the presence of a container that did not exceed the maximum standard height; but, on engaging the top of a container that did exceed that height, it would trip the actuator mechanism to cause rejection of the defective container. Still other applications of this invention will be readily apparent to those skilled in the art.

It is among the advantages of this invention that it provides a simple means for testing certain physical characteristics in a series of containers and does so without delaying the flow of containers on a conveyor line. In addition, the invention provides a reliable and effective means for rejecting containers that do not conform to a given standard, such rejection being made only after the testing procedure has been completed.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In container testing and sorting apparatus having a rotary turret and a plurality of vertically reciprocable gage carriers mounted on the turret and means for feeding containers successively onto the turret and for positioning each container in vertical gaging alignment with a gage carrier, means for testing each container and for later ejecting from the turret any container that does not conform to a predetermined standard, said testing and ejecting means comprising: means for reciprocating each gage carrier downwards and then upwards during each rotation of the turret, a gage supported on each carrier for testing a given physical condition of the container during downward movement of the gage carrier, the gage being mounted to be movable upwards relative to the carrier only when descent of the gage is obstructed as by a nonconforming container, an actuator mounted on each gage carrier and having a normal first position and a tripped second position, tripping means associated with each gage and operable to move its associated actuator from its first position to its second position solely in response to upward movement of the gage relative to the gage carrier, fixed cam means engageable with the actuator in its second position after the gage has been raised above the container, an ejector for ejecting a container from the turret, energizing means for operating the ejector in response to the engagement of the actuator with the fixed cam means, and reset means for resetting the actuator from its second position to its first position after the operation of the ejector and before the beginning of another testing cycle.

2. Apparatus according to claim 1, in which each actuator is pivotally mounted on the carrier for rocking motion between its first and second positions.

3. Apparatus according to claim 2, in which each actuator includes a plunger mounted for axial reciprocation between an extended and a depressed position, spring means urging the plunger into its extended position, a cam follower mounted on the plunger and adapted to engage the fixed cam means when the actuator is in its second position, thereby to depress the plunger for actuating the energizing means.

4. Apparatus according to claim 2, in which the actuator also includes a tripping cam that engages the tripping means of the associated gage.

5. Apparatus according to claim 1, in which the gage consists of a plug that is adapted, upon descent of the gage carrier, to enter the neck opening of a container where that opening is larger than a predetermined standard.

6. Apparatus according to claim 1, in which there is a separate ejector associated with each gage carrier and positioned radially inward of the carrier.

7. Apparatus according to claim 1, in which the resetting means includes a cam follower mounted on the actuator and a second fixed cam means engageable with that follower when the actuator is in its second position.

References Cited by the Examiner
UNITED STATES PATENTS

| | | | |
|---|---|---|---|
| 2,596,342 | 5/1952 | McNutt | 209—88 |
| 2,987,179 | 6/1961 | Allgeyer | 209—88 X |

M. HENSON WOOD, Jr., *Primary Examiner.*

R. A. SCHACHER, *Assistant Examiner.*